July 11, 1950  H. G. HOLSTON  2,515,088

PIPE FORM SUSPENSION AND STRIPPING UNIT

Filed July 5, 1947  2 Sheets-Sheet 1

INVENTOR
H. G. Holston

BY
ATTORNEYS

July 11, 1950 H. G. HOLSTON 2,515,088
PIPE FORM SUSPENSION AND STRIPPING UNIT
Filed July 5, 1947 2 Sheets-Sheet 2
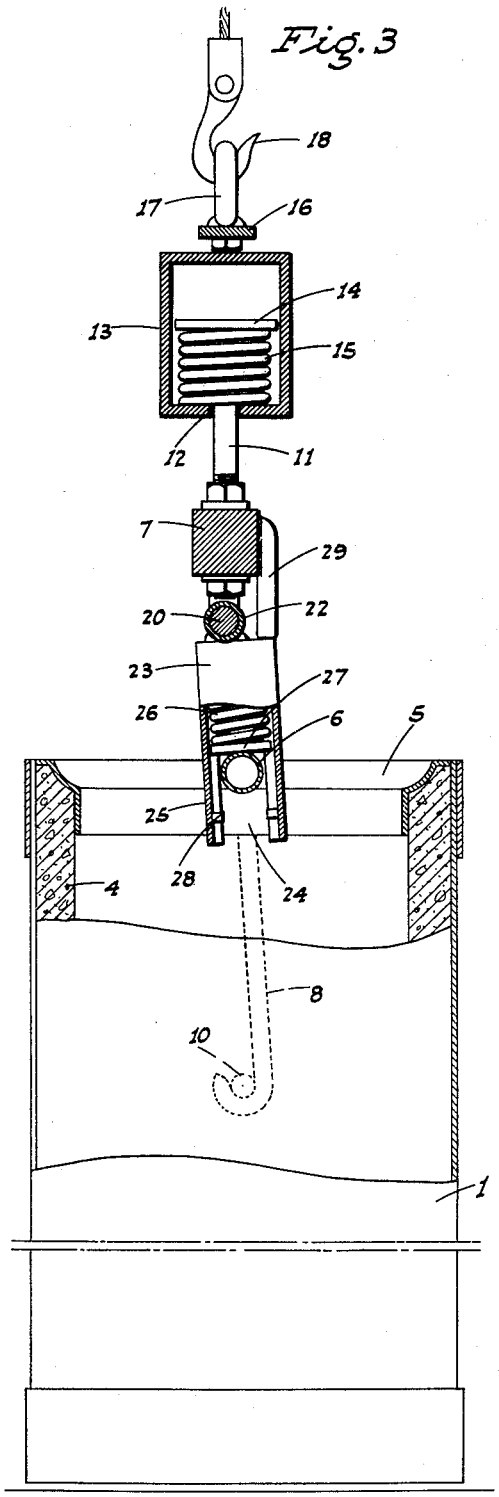
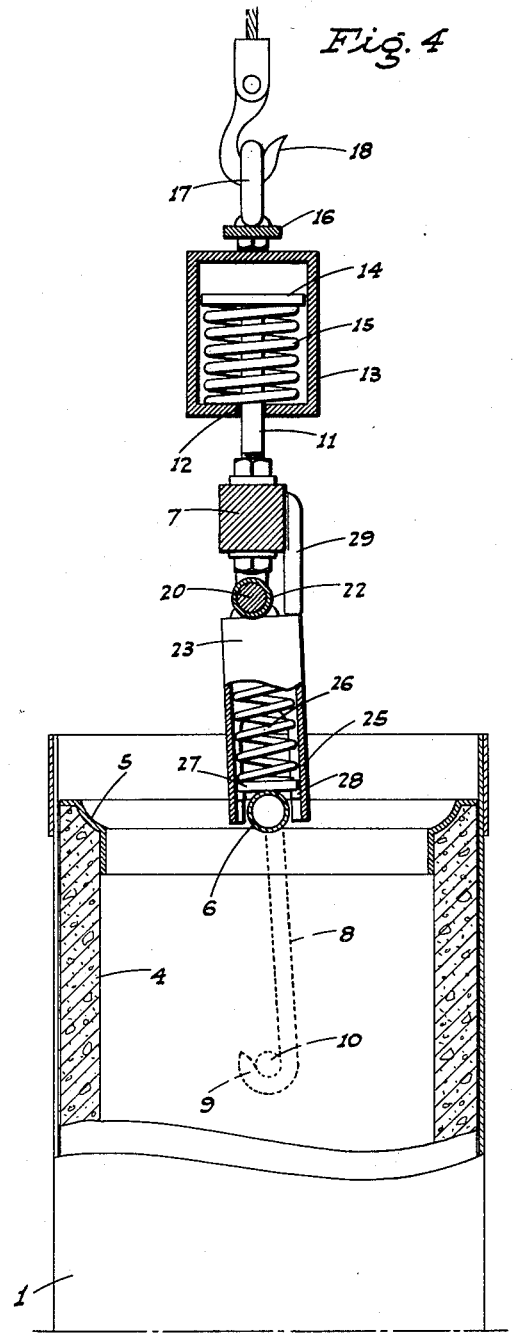
INVENTOR
H. G. Holston
BY
ATTORNEYS Patented July 11, 1950

2,515,088

UNITED STATES PATENT OFFICE 2,515,088

PIPE FORM SUSPENSION AND STRIPPING UNIT

Harold G. Holston, Caruthers, Calif.

Application July 5, 1947, Serial No. 759,026

13 Claims. (Cl. 25—1)

This invention relates generally to a device for use in connection with the manufacture of concrete pipe in a one-piece jacket or form of the type which is diametrically expansible to permit the form to be stripped off the pipe produced therein.

One object of the present invention is to provide a pipe form suspension and stripping unit which is operative to facilitate lifting of said form from the pipe machine, and to then easily and quickly strip the form from the pipe therein.

Another object of the invention is to provide a device, as above, which is constructed in such manner that the form can be stripped from the pipe adjacent the point of manufacture and there deposited directly on a drying pallet for curing.

It is also an object of the invention to provide a device operative to strip the form from pipe made from a very wet cement mix; a wet mix producing a better and stronger pipe.

A further object of the invention is to provide a pipe form suspension and stripping unit which is operative, upon unlatching and expansion of the form, to forcefully push the pipe downward while simultaneously pulling upward on the form; the opposed forces thus assuring of rapid and effective stripping of the form, and with possible deformation or breaking of the fresh pipe minimized.

A further object of the invention is to provide a practical pipe form suspension and stripping unit, and one which will be exceedingly effective for the purpose for which it is designed.

These objects are accomplished by means of such structure and relative arrangement of parts as will fully appear by a perusal of the following specification and claims.

In the drawings:

Fig. 3 is a sectional elevation of the device in upright working position with the springs loaded.

Fig. 4 is a similar view but shows the springs as unloaded, with resultant relative sliding motion between the form and the fresh pipe therein.

Figure 1:
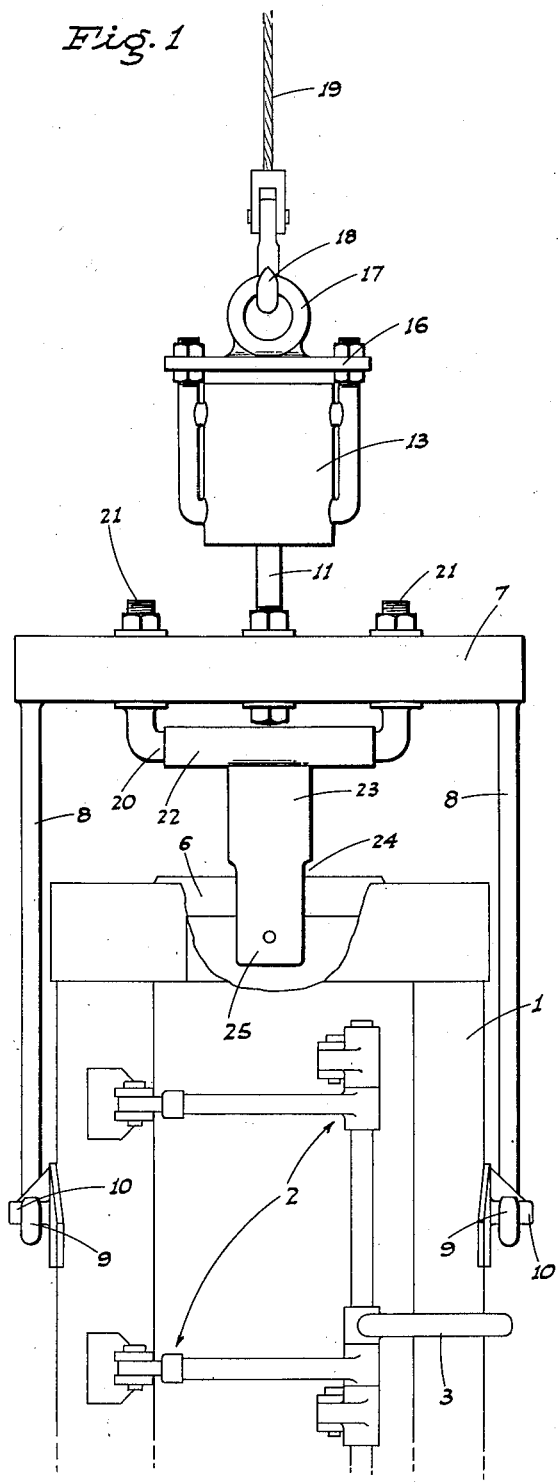
Fig. 1 is a front elevation of the device connected to a pipe form.

Referring now more particularly to the characters of reference on the drawings, the device is adapted for use in connection with the jacket or form used in a pipe making machine for the production of concrete pipe. The form, which is indicated generally at 1, is of one-piece cylindrical type split vertically for diametrical expansion, and which expansion is normally prevented by a releasable latching mechanism 2, which includes a hand lever 3. The form 1 is contracted when in the pipe making machine, and a section of fresh concrete pipe, as at 4, is shaped in the contracted form by the machine; the lower end of the section of pipe seating on a bottom retaining ring which has a configuration to form the male joint, while the upper end of the pipe section 4 is shaped, as the female joint, by a top ring 5. This top ring 5 is placed in the form in shaping relation to the upper end of the pipe section 4 after the form is removed from the pipe making machine. The top ring 5 includes a cross handle 6 which the operator grasps to place said top ring 5; the latter being rotated back and forth by the operator while simultaneously pressed downward, whereby to properly seat such ring directly on the upper end of said pipe section 4.

After a fresh section 4 of pipe is formed in one of the contracted, cylindrical pipe forms 1, and the top ring 5 seated in place, the form is engaged by the suspension and stripping unit, which forms the subject of the present invention, and which comprise the following:

A rigid crossbar 7, of slightly greater length than the diameter of the form 1, is fitted, at opposite ends, with rigid depending legs 8 having hooks 9 on their lower ends; said hooks opening upwardly and being adapted to engage, from below, with lifting trunnions 10 on opposite sides of the form 1 some distance below the top of the latter.

Centrally of its ends the cross bar 7 is fitted with a rigid upstanding rod 11 which projects in relatively slidable relation through a central opening 12 in the bottom of an upstanding cage 13. Within the upstanding cage 13 the rod 11 is formed with a head 14, and a heavy-duty compression spring 15 engages between the head 14 and the bottom of said cage.

A cross plate 16 is fixed in connection with the cage 13 above the same, and includes an upstanding projecting eye 17 adapted for engagement by the hook 18 of a hoist cable 19. The hoist (not shown) from which the cable 19 depends is of a type which permits said hoist cable to be swung from a point adjacent the pipe making machine to another point adjacent a station for pallets upon which the fresh pipe is to be deposited.

Below the rigid cross bar 7 the device includes a horizontal shaft 20 parallel to, but spaced from, such bar. At its ends the horizontal cross shaft 20 includes upturned studs 21 secured to the bar 7.

A rotary sleeve 22 is turnably mounted on the cross shaft 20, and the sleeve 22 is fixed, intermediate its ends, with a depending tubular neck 23.

This neck 23 is notched on opposite sides, as at 24, to form a downwardly opening saddle 25. A heavy-duty compression spring 26 is disposed within the tubular neck 23 between its closed upper end and a movable bottom plate 27 which normally rests against stop pins 28 in opposite sides of the saddle 25. In other words, the heavy-duty compression spring 26 is of such length that it normally extends downwardly to a point adjacent, but short of, the lower end of the saddle 25.

After a contracted and latched form 1 is removed from the pipe making machine with a fresh section 4 of pipe therein, and the top ring 5 applied, the described suspension and stripping unit is used in the following manner:

The hoist cable 19 is manipulated to bring the device directly over the form, and, with the legs 8 straddling the latter, the hooks 9 are engaged with the lifting trunnions 10. At this stage the hoist cable 19 is at such length that the entire device is on an upward incline, as in Fig. 2.

Figure 2:
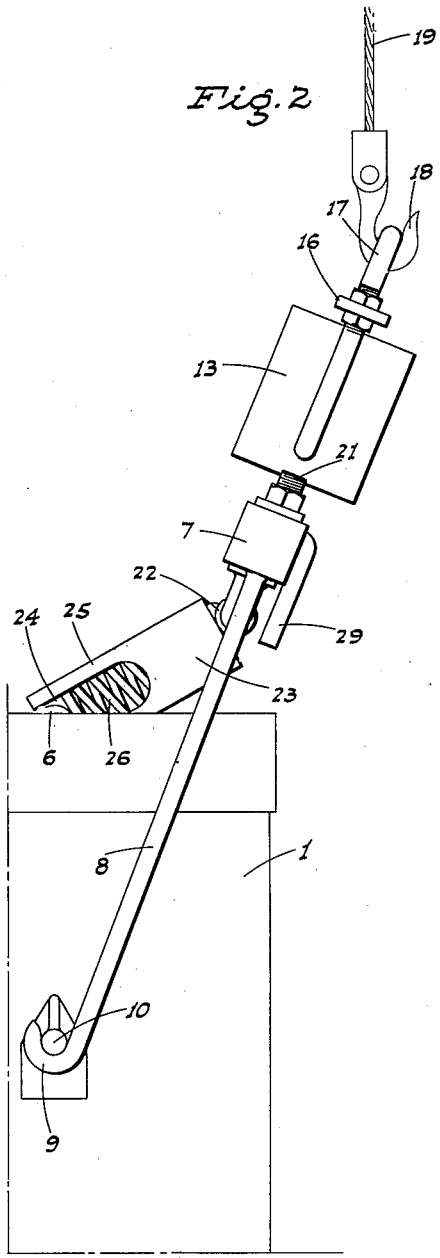
Fig. 2 is a side elevation of the device as initially engaged with a form, but before lifting of the same to upright working position and loading of the springs.

With the device in this position the saddle 25 is manually engaged over the cross handle 6 of the top ring 5, as also shown in Fig. 2, and then the hoist cable 9 is raised until the device is erect, at which time the tubular neck 23 passes dead-center slightly and bears against a stop 29 projecting from the cross bar 6, as in Fig. 3, locking up this assembly. The tubular neck 23 is secured to the rotary sleeve 22 in offset relation, as shown, to facilitate such passage beyond dead-center, and engagement with the stop 29, in locked-up position.

The length of the legs 8 is such that when the device is erected, as above described, the heavy-duty compression spring 26 is loaded, in the manner illustrated in Fig. 3, with the force exerting downwardly on the cross handle 6. Thereafter, with continued raising of the hoist cable 19, the device lifts the form 1 off the floor, whereupon the weight of the form, suspended from the rod 11, loads the compression spring 15 in the cage 13.

With the form 1 suspended off the floor, the hoist cable 19 is manipulated until said form is directly above a pallet onto which the fresh pipe section 4 is to be deposited; the lower end of the form 1 being only a very short distance above the top of said pallet.

With the form so suspended, the hand lever 3 is thrown in a direction to release the latching mechanism, whereupon the form 1 expands diametrically to a considerable extent. When this occurs, the loaded springs 15 and 26, acting in opposition to each other, act to pull upwardly on the form 1 and push downwardly on the top ring 5, respectively. This results in relative vertical slipping motion of the fresh section 4 of pipe and the then expanded form 1; the section moving downwardly and seating on the pallet, while the form slips upwardly.

After the initial slipping motion between the fresh section 4 of pipe and the form 1 is accomplished by the described opposed spring arrangement, the hoist cable 19 is raised to an extent that said form is entirely stripped off the pipe section 4 in a vertically upward direction.

In the concrete pipe making industry it has been the practice heretofore to use a relatively large number of the forms 1, and to leave them on the pipe sections 4 until the latter are cured to a considerable degree. This meant that not only uneconomic use of the forms, but the stripping thereof had to take place in the drying yard rather than immediately adjacent the pipe making machine. With the device of the present invention, a relatively small number of the forms 1 is needed, as such forms can be stripped from the pipe sections while fresh and the sections deposited onto the pallets adjacent the point of manufacture. Thereafter, the pallets with the fresh pipe thereon, and without any surrounding form, travel to the drying yard for curing.

After the form is lifted clear of the fresh section 4 of pipe, proper manipulation of the hoist cable 19 returns said form to adjacent the pipe making machine for its next use. The top ring 5 remains on the upper end of the section 4 and is removed by hand.

The device strips forms from fresh concrete pipe sections rapidly and effectively, with a minimizing of deformation or damage to such sections; it being possible to manufacture pipe, when stripped by the present device, from a much wetter cement mix than otherwise possible, and a wet mix is known to produce a better and stronger pipe.

While the device is shown and described as used in connection with a split-type, one-piece, diametrically expansible jacket or form, such device has also been found extremely effective to strip fresh concrete pipe from a non-split and non-expansible but slightly upwardly tapered type of jacket or form.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A suspension and stripping device for an upstanding, concrete pipe form having a fresh pipe section releasably engaged therein, and a top ring seated on the upper end of the section; the device comprising a member adapted to be connected to a lift mechanism, means to suspend the form from the member, the top ring including a cross handle, and means between the member and top ring cross handle operative to urge the fresh pipe section downward in the suspended form; said means including a cross shaft mounted in connection with the member below the same and in substantial parallelism with the cross handle, a sleeve on the cross shaft rotatable about the longitudinal axis of such shaft, a tubular neck fixed on and depending from the sleeve and having notches on opposite sides to form a saddle which straddles the cross handle, and a compression spring in the neck bearing at its lower end on the cross handle.

2. A suspension and stripping device for an upstanding, concrete pipe form having a fresh pipe section releasably engaged therein, and a top ring seated on the upper end of the section; the device comprising a member adapted to be connected to a lift mechanism, means to suspend the form from the member, the top ring including a cross handle, and means between the member and top ring cross handle operative to urge the fresh pipe section downward in the suspended form; said means including a cross shaft mounted in connection with the member below the same and in substantial parallelism with the cross handle, a sleeve on the cross shaft rotatable about the longitudinal axis of such shaft, a tubular neck fixed on and depending from the sleeve and having notches on opposite sides to form a saddle which straddles the cross handle, and a compression spring in the neck bearing at its lower end on the cross handle; there being stop means positioned to engage the neck when it passes dead center in one direction.

3. A suspension and stripping device for an upstanding, concrete pipe form having a fresh pipe section releasably engaged therein, and a top ring seated on the upper end of the section; the device comprising a member adapted to be connected to a lift mechanism, spaced legs depending from the member adapted to releasably connect with the form on opposite sides to suspend said form, a cross shaft mounted in connection with the member below the same and intersecting the vertical axis of the form, a sleeve on the cross shaft rotatable about the longitudinal axis of such shaft, a tubular neck fixed on and depending from the sleeve and having notches on opposite sides to form a saddle, the top ring including a cross handle, the saddle straddling said cross handle, and a compression spring in the neck bearing at its lower end on the cross handle.

4. A suspension and stripping device for an upstanding, concrete pipe form having a fresh pipe section releasably engaged therein, and a top ring seated on the upper end of the section; the device comprising a suspension assembly adapted to connect between a lift mechanism and the form, a pair of springs in said assembly, said springs being loaded when the form is suspended by said assembly and working in opposition; one spring cooperating with and pushing the top ring downward, and the other spring pulling upward on the form.

5. A suspension and stripping device for an upstanding, concrete pipe form having a fresh pipe section releasably engaged therein, and a top ring seated on the upper end of the section; the device comprising a cross bar adapted to be connected to a lift mechanism, means to suspend the form from the cross bar, and a spring arranged between the cross bar and top ring in a manner such that the spring is loaded and urges the top ring downward when the form is so suspended.

6. A suspension and stripping device for an upstanding concrete pipe form having a fresh pipe section releasably engaged therein, and a top ring seated on the upper end of the section; the device comprising a cross bar adapted to be connected to a lift mechanism, means to suspend the form from the cross bar, a spring arranged between the cross bar and top ring in a manner such that the spring is loaded and urges the top ring downward when the form is so suspended, and another spring arranged between the cross bar and lift mechanism in a manner to pull upward on the suspended form.

7. A suspension and stripping device for an upstanding, concrete pipe form having a fresh pipe section releasably engaged therein, and a top ring seated on the upper end of the section; the device comprising a cross bar, a rod extending upward from the bar intermediate its ends, a cage into which the rod slidably projects from below, a head on the rod in the cage, a compression spring in the cage between the bottom thereof and said head, means to connect the cage to a lift mechanism, means to suspend the form from the cross bar, and spring means between the cross bar and top ring pushing downward on said ring when the form is so suspended.

8. A suspension and stripping device for an upstanding, concrete pipe form having a fresh pipe section releasably engaged therein, and a top ring seated on the upper end of the section; the device comprising a cross bar, a rod extending upward from the bar intermediate its ends, a cage into which the rod slidably projects from below, a head on the rod in the cage, a compression spring in the cage between the bottom thereof and said head, means to connect the cage to a lift mechanism, means to suspend the form from the cross bar, and spring means between the cross bar and top ring pushing downward on said ring when the form is so suspended; the top ring having a cross handle and said spring means working against said handle.

9. A suspension and stripping device for an upstanding, concrete pipe form having a fresh pipe section releasably engaged therein, and a top ring seated on the upper end of the section; the device comprising a cross bar, a rod extending upward from the bar intermediate its ends, a cage into which the rod slidably projects from below, a head on the rod in the cage, a compression spring in the cage between the bottom thereof and said head, means to connect the cage to a lift mechanism, means to suspend the form from the cross bar, and spring means between the cross bar and top ring pushing downward on said ring when the form is so suspended; said form suspension means being of fixed length, and said spring means being loaded when said suspension means is substantially upright.

10. A suspension and stripping device for an upstanding, concrete pipe form having a fresh pipe section releasably engaged therein, and a top ring seated on the upper end of the section; the device comprising a cross bar, a rod extending upward from the bar intermediate its ends, a cage into which the rod slidably projects from below, a head on the rod in the cage, a compression spring in the cage between the bottom thereof and said head, means to connect the cage to a lift mechanism, means to suspend the form from the cross bar, and spring means between the cross bar and top ring pushing downward on said ring when the form is so suspended; said form suspension means being spaced legs adapted to detachably connect to opposite sides of the form, and said spring means including a depending tubular neck notched on opposite sides at its lower end to form a saddle, the top ring having a cross handle and the saddle straddling the same, and a compression spring in the neck loaded when the suspension means is upright and then bearing on the cross handle.

11. A suspension and stripping device for an upstanding, concrete pipe form having a fresh pipe section releasably engaged therein, and a top ring seated on the upper end of the section; the device comprising a cross bar intersecting the vertical axis of the form, a rod extending upward from the bar intermediate its ends, a cage into which the rod slidably projects from below, a head on the rod in the cage, a compression spring in the cage between the bottom thereof and said head, means to connect the cage to a lift mechanism, means to suspend the form from the cross bar, a cross shaft mounted in connection with the cross bar below the same and in substantial parallelism with said cross bar, a sleeve on the cross shaft rotatable about the longitudinal axis of said shaft, a tubular neck fixed on and projecting downward from the rotary sleeve, said neck being notched on opposite sides at its lower end to form a saddle, the top ring having a cross handle and the saddle straddling the same, and a compression spring in the neck loaded when the suspension means is upright and then bearing on the cross handle.

12. A suspension and stripping device for an upstanding, concrete pipe form having a fresh pipe section releasably engaged therein, and a top ring seated on the upper end of the section; the device comprising a cross bar, a rod extending upward from the bar intermediate its ends, a cage into which the rod slidably projects from below, a head on the rod in the cage, a compression spring in the cage between the bottom thereof and said head, means to connect the cage to a lift mechanism, means to suspend the form from the cross bar, said suspension means including transversely spaced legs adapted to detachably connect to opposite sides of the form, and spring means between the cross bar and top ring pushing downward on said ring when the form is so suspended.

13. A suspension and stripping unit for concrete pipe forms, comprising a cross bar, spaced suspension legs depending from the bar, hooks on the lower ends of the legs, a rod extending upward from the bar intermediate its ends, a cage into which the rod slidably projects from below, a head on the rod in the cage, a compression spring in the cage between the bottom thereof and said head, an eye on top of the cage, a cross shaft mounted in connection with the cross bar below the same, a rotary sleeve on the cross shaft, a tubular neck fixed on and projecting downward from the rotary sleeve, said neck being notched on opposite sides at its lower end to form a saddle, and a compression spring in the neck extending downward into the saddle.

HAROLD G. HOLSTON.

REFERENCES CITED

The following references are of record in the file of this patent:

UNITED STATES PATENTS

| Number | Name | Date |
|---|---|---|
| 1,859,191 | Almquist | May 17, 1932 |